United States Patent
Wong et al.

(10) Patent No.: US 9,833,906 B2
(45) Date of Patent: Dec. 5, 2017

(54) METHOD OF PATH PLANNING FOR ARRAY-BASED PICK-AND-PLACE PERFORMED WITH ROBOTIC ARM AND COMPENSATOR FOR USE WITH THE METHOD

(71) Applicant: HIWIN TECHNOLOGIES CORP., Taichung (TW)

(72) Inventors: Chen-Ming Wong, Taichung (TW); Shu-Hung Liu, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 4 days.

(21) Appl. No.: 15/062,478

(22) Filed: Mar. 7, 2016

(65) Prior Publication Data

US 2017/0252927 A1    Sep. 7, 2017

(51) Int. Cl.
*B25J 11/00* (2006.01)
*B25J 9/16* (2006.01)

(52) U.S. Cl.
CPC ... *B25J 9/1692* (2013.01); *G05B 2219/39024* (2013.01)

(58) Field of Classification Search
CPC ........ G05B 19/41825; G05B 19/45031; G05B 19/18; Y10S 414/136; B25J 15/103
USPC .................... 700/251, 245, 254; 901/5, 7, 9; 414/217, 225.01, 730, 735
See application file for complete search history.

(56) References Cited

U.S. PATENT DOCUMENTS

| | | | |
|---|---|---|---|
| 4,745,681 A | 5/1988 | Hollis, Jr. et al. | |
| 5,513,299 A * | 4/1996 | Terasaki | B25J 9/1661 700/255 |
| 5,908,283 A * | 6/1999 | Huang | B65G 47/90 414/21 |
| 2014/0241843 A1* | 8/2014 | Golda | B25J 15/0085 414/751.1 |

FOREIGN PATENT DOCUMENTS

WO    WO 2009/007824 A1    1/2009

\* cited by examiner

*Primary Examiner* — Dalena Tran
(74) *Attorney, Agent, or Firm* — Muncy, Geissler, Olds & Lowe PC

(57) ABSTRACT

A method of path planning for array-based pick-and-place performed with a robotic arm is characterized in that: during each instance of the pick-and-place process performed with the robotic arm, an X-axis position sensor and a Y-axis position sensor sense coordinate errors of a pick-and-place point such that a controller calculates a position compensation value according to the sum of vectors of the coordinate errors, corrects the pick-and-place position of the robotic arm according to the position compensation value, and generates the coordinates of the next pick-and-place point. By repeating the aforesaid process flow, it is feasible to perform plenty array-based pick-and-place jobs.

2 Claims, 3 Drawing Sheets

METHOD OF PATH PLANNING FOR ARRAY-BASED PICK-AND-PLACE PERFORMED WITH ROBOTIC ARM AND COMPENSATOR FOR USE WITH THE METHOD

BACKGROUND OF THE INVENTION

1. Technical Field

The present invention relates to robotic arms and more particularly to a method of path planning for array-based pick-and-place performed with a robotic arm and a compensator for use with the method.

2. Description of Related Art

An array-based pick-and-place process performed with a robotic arm is accompanied by the accumulation of errors; as a result, the robotic arm can only operate within a limited range of duty. Regarding related prior art, WO 2009/007824 A1 discloses effectuating X-Y plane compensation with a linear guideway and a parallel four-bar linkage and using a spring sensor to feed back an overtravel-related alert signal whereby a robotic arm stops its operation. However, the spring sensor of WO 2009/007824 A1 cannot sense the distance traveled by the robotic arm in the X-Y direction. Furthermore, the alert signal sent from the spring sensor causes the robotic arm to stop operating and thus fail to perform the rest of the array-based pick-and-place process.

U.S. Pat. No. 4,745,681 discloses sensing, with force sensors disposed in the vicinity of a gripper, the pressure of a gas drawn in or discharged through a pin hole, moving the gripper repeatedly to enable a pin to align with the pin hole as well as possible if the gas pressure is sensed to be unevenly distributed, and inserting the pin into the pin hole with the gripper as soon as the force sensors sense that the gas pressure is uniformly distributed. However, the invention claimed by U.S. Pat. No. 4,745,681 has drawbacks as follows: taking much time to wait for the equilibrium of gas pressure level; incurring too much costs because one gripper requires four force sensors; and being inapplicable to high-precision products.

SUMMARY OF THE INVENTION

It is an objective of the present invention to provide a method of path planning for array-based pick-and-place performed with a robotic arm, so as to not only perform plenty array-based pick-and-place jobs by signal feedback and position compensation but also eliminate accumulation of errors.

In order to achieve the above and other objectives, the present invention provides a path planning method which comprises the steps as follows: (step a) operating a robotic arm to perform origin calibration: (step b) generating a coordinate position of a next pick-and-place point with a controller: (step c) instructing the robotic arm, with the controller, to perform a pick-and-place process according to the coordinate position of the next pick-and-place point: (step d) sensing an X-axis displacement and a Y-axis displacement of the robotic arm during the pick-and-place process and feeding back a sensing result to the controller, with an X-axis position sensor and a Y-axis position sensor: (step e) calculating a coordinate error of the pick-and-place point according to the X-axis displacement and the Y-axis displacement of the robotic arm with the controller: (step f) and calculating a position compensation value of the robotic arm according to the coordinate error with the controller, wherein step f is followed by step b.

Preferably, upon completion of an instance of the pick-and-place process, the controller determines whether the final pick-and-place point has been identified, with an affirmative determination causing the controller to instruct the robotic arm to stop operating, and a negative determination triggering step d. By effectuating feedback and compensation repeatedly, it is feasible to not only eliminate error amplification but also perform plenty array-based pick-and-place jobs.

DETAILED DESCRIPTION OF THE EMBODIMENT OF THE INVENTION

Figure 1:
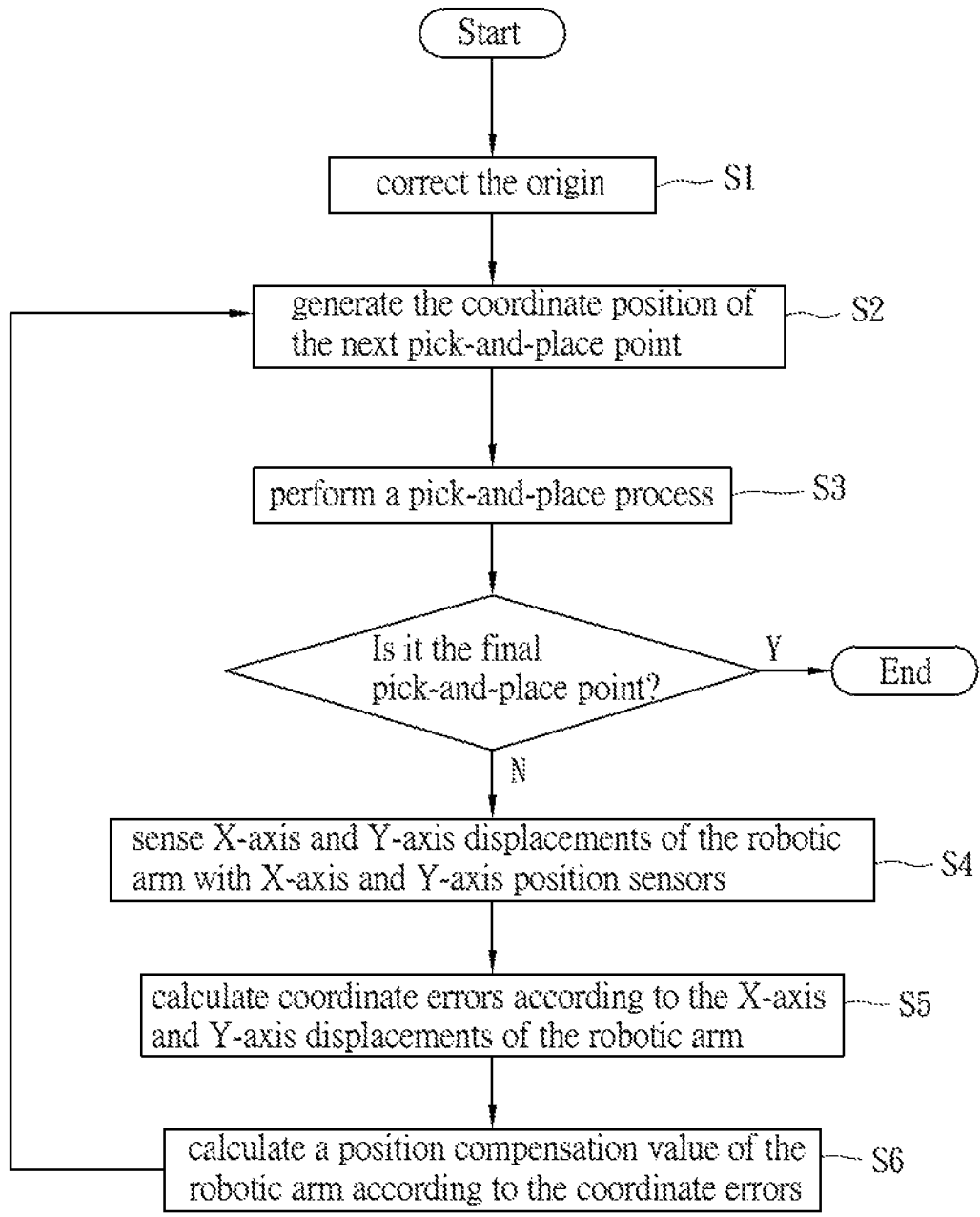
FIG. 1 is a flowchart of the present invention.
Figure 2:
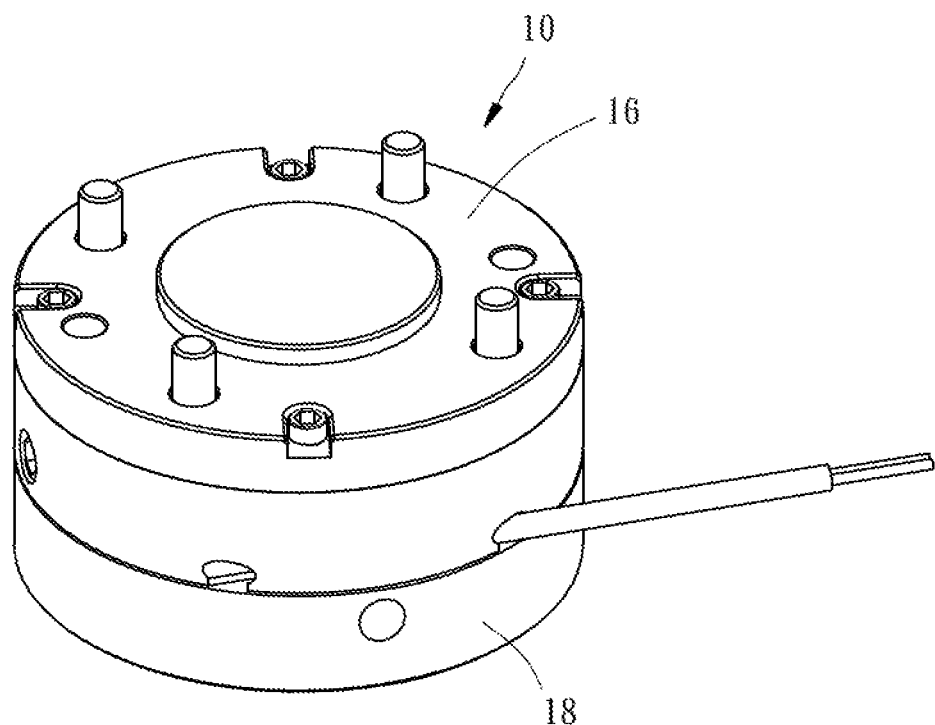
FIG. 2 is a perspective view of a compensator provided by the present invention.

Referring to FIG. 1, a path planning method of the present invention comprises the steps as follows:

Step a (S1): operating a robotic arm to perform origin calibration.

Step b (S2): generating a coordinate position of a next pick-and-place point with a controller.

Step c (S3): instructing the robotic arm, with the controller, to perform a pick-and-place process according to the coordinate position of the next pick-and-place point.

Figure 3:
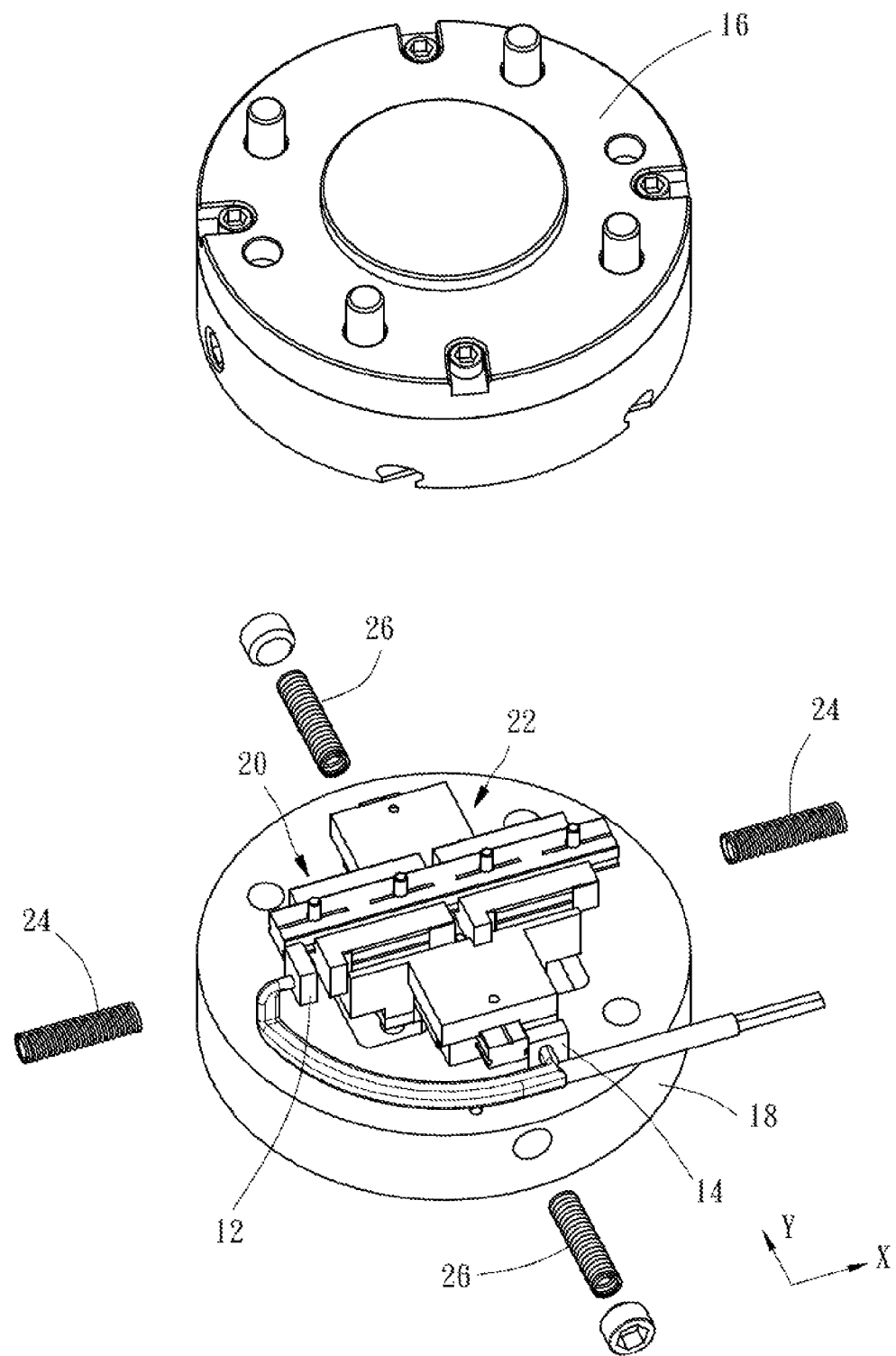
FIG. 3 is an exploded view of the compensator provided by the present invention.

Step d (S4): sensing an X-axis displacement and a Y-axis displacement of the robotic arm during the pick-and-place process and feeding back a sensing result to the controller, with an X-axis position sensor 12 and a Y-axis position sensor 14, as shown in FIG. 3.

In the embodiment, the X-axis position sensor 12 and the Y-axis position sensor 14 are jointly disposed in a compensator 10 of the robotic arm. Referring to FIG. 3, the compensator 10 provided by the present invention not only comprises the X-axis position sensor 12 and the Y-axis position sensor 14 but also comprises a first member 16, a second member 18, an X-axis linear guideway 20, a Y-axis linear guideway 22, two opposite X-axis restoring resilient elements 24, and two opposite Y-axis restoring resilient elements 26.

The top surface of the first member 16 is connected to the robotic arm.

The top surface of the second member 18 is connected to the bottom surface of the first member 16. The bottom surface of the second member 18 is connected to a terminal tool (not shown).

The X-axis linear guideway 20 is disposed on the top surface of the second member 18 to enable the second member 18 to move in an X-axis direction relative to the first member 16 through the X-axis linear guideway 20.

The Y-axis linear guideway 22 is disposed on the top surface of the second member 18 to enable the second member 18 to move in a Y-axis direction relative to the first member 16 through the Y-axis linear guideway 22.

The X-axis restoring resilient elements 24 are disposed horizontally between the first member 16 and the second member 18 and aligned in the X-axis direction to exert a restoring force on the second member 18, thereby allowing the second member 18 to return to its initial position when not subjected to a lateral force.

The Y-axis restoring resilient elements 26 are disposed horizontally between the first member 16 and the second member 18 and aligned in the Y-axis direction to exert a restoring force on the second member 18, thereby allowing the second member 18 to return to its initial position when not subjected to a lateral force.

The X-axis position sensor 12 is disposed at one end of the X-axis linear guideway 20 to sense the distance traveled by the X-axis linear guideway 20.

The Y-axis position sensor 14 is disposed at one end of the Y-axis linear guideway 22 to sense the distance traveled by the Y-axis linear guideway 22.

Step e (S5): calculating coordinate errors of the pick-and-place point of step b according to the X-axis displacement and the Y-axis displacement of the robotic arm with the controller.

Step f (S6): calculating a position compensation value of the robotic arm according to the coordinate errors of step e with the controller. Step f is followed by step b.

Figure 4:
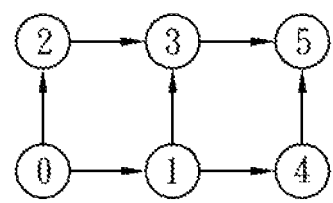
FIG. 4 is a schematic view of path planning of the present invention.

The aforesaid steps are hereunder illustrated with FIG. 4 and Table 1 and exemplified by six array-based pick-and-place points. The coordinates of the origin are denoted by P0. The coordinates attributed to the first pick-and-place point and generated by the controller are denoted by P1. The controller obtains coordinate error $\epsilon_{1xy}$ of P1 after performing the pick-and-place process at P1. Then, the controller generates the second pick-and-place point. The coordinates of the second pick-and-place point are denoted by P2. The controller obtains coordinate error $\epsilon_{2xy}$ of P2 after performing the pick-and-place process at P2. Then, the controller generates the third pick-and-place point. The coordinates of the third pick-and-place point are denoted by P3. During the pick-and-place process performed at P3 by the controller, the controller calculates a position compensation value according to the two previously-obtained coordinate errors $\epsilon_{1xy}$, $\epsilon_{2xy}$ such that the controller corrects and changes the pick-and-place position of the robotic arm to P3' according to the calculated position compensation value and obtains coordinate error $\epsilon_{3xy}$ of P3. The coordinates of the fourth pick-and-place point are denoted by P4. During the pick-and-place process performed at P4 by the controller, the controller calculates a position compensation value according to the previously-obtained coordinate error $\epsilon_{1xy}$ such that the controller corrects and changes the pick-and-place position of the robotic arm to P4' according to the calculated position compensation value and obtains coordinate error $\epsilon_{4xy}$ of P4. The coordinates of the fifth pick-and-place point are denoted by P5. During the pick-and-place process performed at P5 by the controller, the controller calculates a position compensation value according to the two previously-obtained coordinate errors $\epsilon_{3xy}$, $\epsilon_{4xy}$ such that the controller corrects and changes the pick-and-place position of the robotic arm to P5' according to the calculated position compensation value and obtains coordinate error $\epsilon_{5xy}$ of P5. The details of the rest of the process flow can be inferred by analogy.

TABLE 1

| original position | coordinate error | corrected position |
| --- | --- | --- |
| P1 | $\epsilon_{1xy}$ | P1 |
| P2 | $\epsilon_{2xy}$ | P2 |
| P3 | $\epsilon_{3xy}$ | P3' = P3 + $\epsilon_{1xy}$ + $\epsilon_{2xy}$ |
| P4 | $\epsilon_{4xy}$ | P4' = P4 + $\epsilon_{1xy}$ |
| P5 | $\epsilon_{5xy}$ | P5' = P5 + $\epsilon_{3xy}$ + $\epsilon_{4xy}$ |

Upon completion of an instance of the pick-and-place process, the controller determines whether the final pick-and-place point has been identified. An affirmative determination causes the controller to instruct the robotic arm to stop operating. A negative determination triggers step d.

Therefore, the present invention is characterized in that: during each instance of the pick-and-place process performed with the robotic arm, the X-axis and Y-axis position sensors 12, 14 sense coordinate errors of a pick-and-place point such that the controller calculates a position compensation value according to the sum of vectors of the coordinate errors and corrects the pick-and-place position of the robotic arm according to the position compensation value. By repeating the aforesaid process flow, it is feasible to not only eliminate error amplification but also perform plenty array-based pick-and-place jobs, thereby achieving the objective of the present invention.

What is claimed is:

1. An array-based pick-and-place method performed with a robotic arm, the method comprising:
    step a: operating a robotic arm to perform origin calibration;
    step b: generating a coordinate position of a next pick-and-place point with a controller;
    step c: instructing the robotic arm, with the controller, to perform a pick-and-place process according to the coordinate position of the next pick-and-place point;
    step d: sensing an X-axis displacement and a Y-axis displacement of the robotic arm during the pick-and-place process and feeding back a sensing result to the controller, with an X-axis position sensor and a Y-axis position sensor;
    step e: calculating coordinate errors of the pick-and-place point of step b according to the X-axis displacement and the Y-axis displacement of the robotic arm based on the sensing result with the controller; and
    step f: calculating a position compensation value of the robotic arm according to the coordinate errors of step e with the controller, wherein step f is followed by step b,
    wherein the X-axis position sensor and the Y-axis sensor are jointly disposed in a compensator of the robotic arm, and
    wherein the compensator comprises:
    a first member;
    a second member connected to a bottom surface of the first member;
    an X-axis linear guideway disposed at the second member to enable the second member to move in an X-axis direction relative to the first member through the X-axis linear guideway;
    a Y-axis linear guideway disposed at the second member to enable the second member to move in a Y-axis direction relative to the first member through the Y-axis linear guideway;
    two opposite X-axis restoring resilient elements disposed between the first member and the second member and aligned in the X-axis direction to exert a restoring force on the second member;

two opposite Y-axis restoring resilient elements disposed between the first member and the second member and aligned in the Y-axis direction to exert a restoring force on the second member;

the X-axis position sensor disposed at an end of the X-axis linear guideway and adapted to sense a distance traveled by the X-axis linear guideway; and the Y-axis position sensor disposed at an end of the Y-axis linear guideway and adapted to sense a distance traveled by the Y-axis linear guideway.

2. The method of claim 1, wherein, upon completion of an instance of the pick-and-place process in step c, the controller determines whether a final pick-and-place point has been identified, if the controller determines that the final pick-and-place point has been identified, the controller to instruct the robotic arm to stop operating, and if the controller determines that the final pick-and-place point has not been identified, step d is performed.

* * * * *